US011858290B2

(12) United States Patent
Zhou et al.

(10) Patent No.: US 11,858,290 B2
(45) Date of Patent: Jan. 2, 2024

(54) LIQUID APPLICATOR

(71) Applicant: MICROPOROUS TECHNOLOGY (NINGBO) LIMITED, Zhejiang (CN)

(72) Inventors: Xingfu Zhou, Shaoxing (CN); Liping Wang, Ningbo (CN)

( * ) Notice: Subject to any disclaimer, the term of this patent is extended or adjusted under 35 U.S.C. 154(b) by 372 days.

(21) Appl. No.: 17/309,143

(22) PCT Filed: Feb. 28, 2019

(86) PCT No.: PCT/CN2019/076602
§ 371 (c)(1),
(2) Date: Nov. 19, 2021

(87) PCT Pub. No.: WO2020/093628
PCT Pub. Date: May 14, 2020

(65) Prior Publication Data

US 2022/0080765 A1 Mar. 17, 2022

(30) Foreign Application Priority Data

Nov. 10, 2018 (CN) ........................ 201811335505.8

(51) Int. Cl.
*B43K 8/06* (2006.01)
*A45D 34/04* (2006.01)
(Continued)

(52) U.S. Cl.
CPC ................ *B43K 8/06* (2013.01); *A45D 34/04* (2013.01); *B43K 8/022* (2013.01); *B43K 8/024* (2013.01);
(Continued)

(58) Field of Classification Search
CPC ........ B43K 8/022; B43K 8/024; B43K 8/026; B43K 8/03; B43K 8/06; A45D 34/04
See application file for complete search history.

(56) References Cited

U.S. PATENT DOCUMENTS 5,967,687 A 10/1999 Oike
7,887,246 B2 * 2/2011 Hori ...................... A45D 40/20
401/199
(Continued)

FOREIGN PATENT DOCUMENTS

CN 105172422 A 12/2015
JP 0248377 U 4/1990
(Continued)

OTHER PUBLICATIONS

China Nat'l IP Admin., International Search Report for PCT/CN2019/076602, dated Aug. 8, 2019.

*Primary Examiner* — Jennifer C Chiang
(74) *Attorney, Agent, or Firm* — Cherskov Flaynik & Gurda, LLC

(57) ABSTRACT

A liquid applicator is described. The liquid applicator includes an applicating head, a buffer in communication with the outside air, a gas-liquid exchanger, and a reservoir supplying a liquid to the gas-liquid exchanger. The gas-liquid exchanger has a wick, a liquid sealing tube covering on the outer peripheral wall of the wick, and a gas-liquid channel disposed between the wick and the liquid sealing tube; the buffer covers on the outer peripheral wall of the liquid sealing tube, and capillary pressure of the liquid sealing tube is greater than capillary pressure of the buffer by 30% or more. The liquid applicator can effectively control the release of a liquid. It can prevent the liquid from leaking out. It features a simple structure, resulting in smooth application and easy manufacturing.

20 Claims, 6 Drawing Sheets

(51) Int. Cl.

| | |
|---|---|
| ***B43K 8/03*** | (2006.01) |
| ***B43K 8/02*** | (2006.01) |
| *A45D 34/00* | (2006.01) |

(52) U.S. Cl.
CPC ................ *B43K 8/026* (2013.01); *B43K 8/03* (2013.01); *A45D 2034/005* (2013.01); *A45D 2200/054* (2013.01); *A45D 2200/1009* (2013.01)

(56) References Cited

U.S. PATENT DOCUMENTS

| | | | | |
|---|---|---|---|---|
| 9,266,380 | B2 | 2/2016 | Wang et al. | |
| 11,370,243 | B2 * | 6/2022 | Hori | B43K 8/06 |

FOREIGN PATENT DOCUMENTS

| | | | |
|---|---|---|---|
| JP | 5933792 | B1 | 6/2016 |
| WO | WO2016112692 | A1 | 8/2016 |

* cited by examiner

LIQUID APPLICATOR

PRIORITY CLAIM

This application is a U.S. Nationalization of PCT application PCT/CN2019/076602 filed on Feb. 28, 2019 which in turn claimed priority to Chinse application CN 201811335505.8 filed on Nov. 10, 2018. The contents of each application is hereby incorporated by reference.

FIELD OF THE INVENTION

The invention relates to a liquid applicator, more particularly to the technical field of controlling the release of various liquids from writing instruments and applicator of cosmetics.

BACKGROUND OF THE INVENTION

In the technical field of controlling the release of liquid, porous materials are widely used, such as in marker pens, using porous materials as media that absorb and hold liquids. In the prior art, the most commonly used porous material is a film-wrapped fiber formed by covering the fiber bundles with a film. When used, it is put into the housing and inserted into the applicating head. The two ends of the film-wrapped fiber are communicated with the atmosphere, so that the air discharges the liquid spread from both ends and when the liquid is injected, which will also facilitate the release of liquid. However, the liquid output of the film-wrapped fiber will gradually decrease with the increase of the using time, and the film-wrapped fiber has the disadvantage of a large amount of stranded fluid.

In the technical field of controlling the release of liquid, another commonly used technology is to use a wick to conduct the liquid and use a fin group to control the release of liquid, which is suitable for the application of small ink output, such as water-based ball pens, this technology of the wick and the fin group combined requires high manufacturing precision, and the liquid is easy to leak when the quality of components fluctuates slightly or when encountering abnormal environmental changes such as temperature differences and pressure differences. Chinese Patent Application No. 201510018984.0 discloses a free ink writing instrument, which arranged an adjusting portion between an ink tube and a nib. This technology uses very precise intermittence in the adjustment portion to control the ink release. This liquid release technology better solves the problem of the liquid applicator of the film-wrapped fiber, and is conducive to the application of large fluid output, but the design of the adjustment portion is more complicated, and the intermittent size control of the adjustment portion requires extremely precise and high manufacturing cost. In both techniques, because the nib is far away from the ink tube and between the two only the wick is used to conduct the liquid, resulting in a common defect is: if the nib is placed up for a period or the nib is used upwards, both can easily lead the nib part to lack ink and affect the functions.

SUMMARY OF THE INVENTION

In order to solve the problems of traditional film-wrapped fiber-like liquid applicators and some existing free ink applicators, the present invention proposes a liquid applicator, comprising: an applicating head, a buffer in communication with the outside air, a gas-liquid exchanger and a liquid storage tube supplying a liquid to the gas-liquid exchanger. The gas-liquid exchanger has a wick, a liquid sealing tube covering on the outer peripheral wall of the wick, and a gas-liquid channel disposed between the wick and the liquid sealing tube; and the buffer covers on the outer peripheral wall of the liquid sealing tube, and capillary pressure of the liquid sealing tube is greater than capillary pressure of the buffer by 30% or more.

Further, grooves are provided on the outer peripheral wall of the wick, and the gas-liquid channel is formed between the grooves and the inner peripheral wall of the liquid sealing tube.

Further, the liquid sealing tube is made of porous material.

Further, the maximum inscribed circle diameter of the cross-section of a gas-conduction channel is 0.1-0.8 mm when the gas-liquid channel is served as the gas-conduction channel.

Further, the buffer is made of porous material.

Further, the wick passes through the lower end of the liquid sealing tube to connected to the applicating head.

Further, a sleeve is provided at the bottom of the reservoir.

Further, the protection body is provided under the gas-liquid exchanger, and capillary pressure of the protection body is not greater than capillary pressure of the buffer.

Further, the buffer and the liquid sealing tube are integrally formed, and the outer peripheral wall of the liquid sealing tube and the inner peripheral wall of the buffer are bonded.

Further, the applicating head is inserted into the gas-liquid exchanger and connected to a part of the inner wall of the liquid sealing tube.

According to the technical solution of the present invention, can effectively control the release of a liquid, the output of the liquid is smooth and stable, and can effectively prevent the liquid from leaking out under abnormal conditions; features a simple structure and easy manufacturing.

BRIEF DESCRIPTION OF THE DRAWINGS

Hereinafter, the specific embodiments of the present invention will be further described when taken in conjunction with the drawings.

DETAILED DESCRIPTION OF THE INVENTION

Figure 1A:
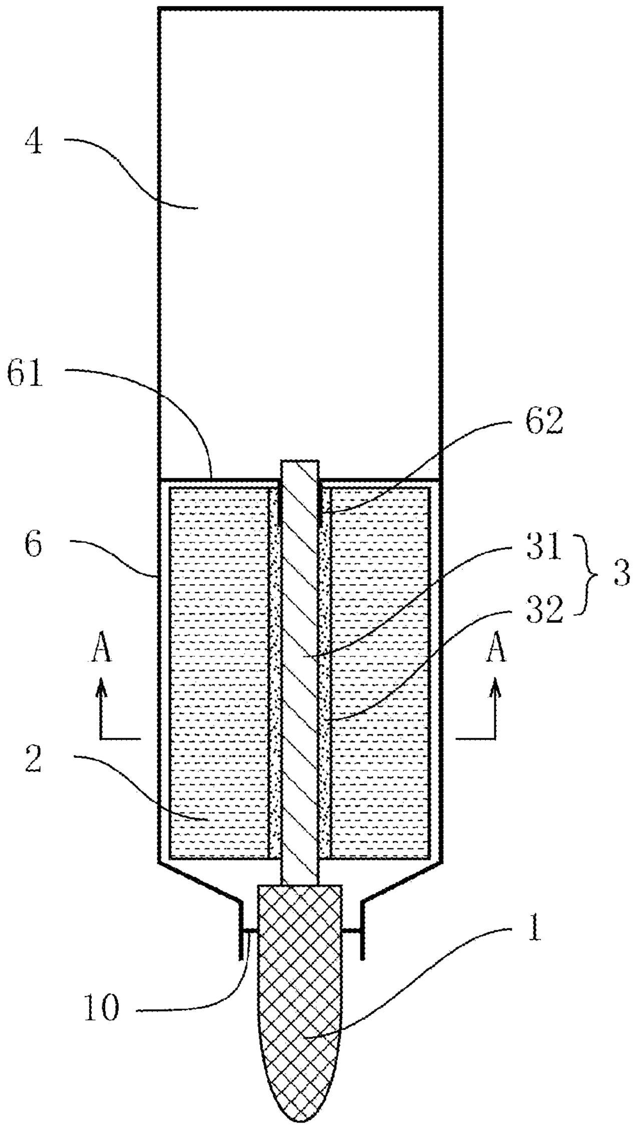
FIG. 1*a* is a schematic structural view of the liquid applicator according to the first embodiment of the present invention.

The following describes the embodiments of the present invention with specific embodiments. The person skilled in the art may easily understand other advantages and effects of the present invention from the content disclosed in this specification. Although the description of the present invention will be introduced together with the preferable embodiment, it does not represent that the features of the present invention are limited to the embodiment. On the contrary, the purpose of combining the embodiment to introduce the invention is to cover the choices or improvements based on the claims of the present invention or which may extend over it. In order to provide deep understanding of the present invention, the following description will contain many specific details. The present invention may not use to implement these details. Besides, in order not to confuse or bedim the key point of the present invention, some specific details will be omitted in the description.

Besides, "up", "down", "front", "back" used in the following description, are defined by the space position based on the fume hood used by the experimenters in the laboratory, while it should not be understood as the limitation to the present invention. In the present invention, "down", "front" refers to an end of an applicating head, "up", "back" refers to an end of a reservoir.

The normal condition or the not specifically noted condition mentioned in the present invention usually refers to the room temperature and standard atmospheric pressure, and the abnormal condition refers to the outside temperature or in which pressure deviates from the normal condition. Capillary pressure P in the present invention is defined as the pressure produced when in the normal condition, an end of a porous body (liquid sealing tube or buffer) of sufficient length (generally required 2-15 cm) is just in contact with the horizontal liquid surface and after positioned upright for 30 minutes; the liquid rises to the height of h, $$P=\rho gh,$$

in which the p is the density of the liquid, g is the gravitational acceleration, and h is the rising height of the liquid.

The test method of the rising height of the liquid h in the present invention is defined as follows:

1) Put a porous body with a length of H into a liquid to absorb the fluid until saturation, then test its saturated absorption weight of $W_0$,
2) With the same porous body and the same liquid, one end of the porous body is just in contact with the liquid surface and positioned vertically for 30 minutes, test its absorption weight of W,
3) Calculate the value of h is as: $h=(W/W_0)\times H$ As shown in FIG. 1*a* to FIG. 6*b*, according to the liquid applicator of the present invention, comprising: an applicating head 1, a buffer 2 in communication with the outside air, a gas-liquid exchanger 3, and a reservoir 4 supplying a liquid to the gas-liquid exchanger 3, the gas-liquid exchanger 3 has a wick 31, liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, and capillary pressure of the liquid sealing tube 32 is greater than capillary pressure of the buffer 2 by 30% or more.

A Gas-Liquid Exchanger

According to the liquid applicator of the present invention, the gas-liquid exchanger 3 has a wick 31, a liquid sealing tube 32 covering on the outer peripheral wall of the wick 31, and a gas-liquid channel 30 disposed between the wick 31 and the liquid sealing tube 32.

A Wick

The wick 31 of the present invention can be made of bonded fiber, such as bonded polyester fiber, acrylic fiber, or the like. In addition, a groove is provided on the outer peripheral wall of the wick 31, the gas-liquid channel 30 is formed by the groove and the inner peripheral wall of the liquid sealing tube 32. That is, one or more grooves which is provided on the outer peripheral wall of the wick 31 and extended from one end to the other end are used as the gas-liquid channel 30. When providing only one groove, the groove serves as a gas-conduction channel for conducting the air to the reservoir 4, and the wick 31 servers as a liquid-conduction channel for transferring the liquid from the reservoir 4 to the applicating head 1. When providing multiple grooves, a part of the grooves can also serve as a liquid-conduction channel for transferring the liquid from the reservoir 4 to the applicating head 1.

The wick 31 of the present invention may also be made of plastics of which the surface can be wetted by the liquid, such as polyformaldehyde, nylon, etc., two or more grooves provided on the surface of the plastic wick 31, wherein at least one groove serves as a gas-conduction channel for conducting the air to the reservoir 4, the rest of r grooves serve as a liquid-conduction channel for transferring the liquid from the reservoir 4 to the applicating head 1.

A Liquid Sealing Tube

The liquid sealing tube 32 of the present invention is made of porous material, such as filtration membrane or fiber. The wall thickness of the liquid sealing tube 32 is 0.1-5 mm, for example 0.1 mm, 0.5 mm, 1 mm, 2 mm, 5 mm. The thinner wall of the liquid sealing tube 32 can be made of a filtration membrane, and the thicker wall of the liquid sealing tube 32 can be made of homogenous fiber or bonded bicomponent fiber. The thinner wall of the liquid sealing tube 32 has a smaller capacity, which is beneficial to utilize more fully and release the liquid, as well as to reduce the residual amount; and the thicker wall of the liquid sealing tube 32 has a larger capacity, which is beneficial to retain more liquid in the gas-liquid exchanger 3, so that it also has good liquid release performance even when the applicating head 1 is used upwards.

The liquid sealing tube 32 covers on the outer peripheral wall of the wick 31. The liquid sealing tube 32 may partially or completely covers on the outer peripheral wall of the wick 31. The covering area can be reasonably selected according to the needs of the design.

After the liquid sealing tube 32 absorbs a certain amount of liquid so that the air cannot pass through the liquid sealing tube 32 radially, thereby isolating the wick 31 from the gas-liquid channel 30 and the buffer 2, in this case, the reservoir 4 exchanges air with the outside only by the gas-liquid channel 30, but not from the buffer 2 through the liquid sealing tube 32. The gas-liquid channel 30 is formed between the inner wall of the liquid sealing tube 32 after absorbing the liquid and the wick 31 and the grooves provided on its surface, in addition, most of the space of the gas-liquid channel 30 is filled with liquid, so that the gas-liquid channel 30 is liquid-sealed into multiple small bubbles. When the liquid is discharged from the reservoir 4 through the gas-liquid exchanger 3, the pressure difference between the reservoir 4 and the outside increases, which pushes the bubbles in the gas-liquid channel 30 to move to the reservoir 4 and enter in the reservoir 4, so that the pressure difference between the reservoir 4 and the outside is reduced until balance, while the new liquid sealing segment and small bubbles are formed in the gas-liquid channel 30. The capillary pressure of the liquid sealing tube 32 is greater than the capillary pressure of the buffer 2 by 30% or more, which makes it difficult for the buffer 2 to absorb liquid from the liquid sealing tube 32 in normal conditions.

A Gas-Liquid Exchanger

The gas-liquid exchanger 3 of the present invention includes the wick 31 and the liquid sealing tube 32, in which the outer peripheral wall of the wick 31 is covered by the liquid sealing tube 32 completely or partially.

The gas-liquid channel 30 is formed by the groove provided on the outer peripheral wall of the wick 31 of the gas-liquid exchanger 3 and the inner wall of the liquid sealing tube 32, and is in communication with the outside air. According to the use requirements of the liquid applicator and the liquid properties therein, when the gas-liquid channel 30 serving as the gas-conduction channel, the maximum inscribed circle diameter of the cross-section of the gas-conduction channel is 0.1-0.8 mm. The gas-conduction channels with different maximum inscribed circle diameters have different capillary pressures to control the liquid sealing strength when conducting the air. The smaller the maximum inscribed circle diameter is, the smaller the gas-conduction amount is, which is suitable for the liquid applicator with smaller liquid output. The larger the maximum inscribed circle diameter is, the larger the gas-conduction amount is, which is suitable for the liquid applicator with larger liquid output.

The fluid-conduction channel is also provided in the gas-liquid exchanger 3. The wick 31 made of fibers per se can be served as the fluid-conduction channel, and the grooves provided on the surface of the wick 31 or the grooves with the inner wall of the liquid sealing tube 32 can also be formed into the fluid-conduction channel. When the liquid used in the liquid applicator contains larger particles, such as pearlescent ink or metal ink, the fluid-conduction channel which has grooves, is particularly important because the normal wick 31 without grooves will filter the whole or part of the particles in the liquid.

A Buffer

The buffer 2 covers on the outer peripheral wall of the liquid sealing tube 32, and the capillary pressure of the liquid sealing tube 32 is greater than the capillary pressure of the buffer 2 by 30% or more.

The buffer 2 can partially cover on the outer peripheral wall of the liquid sealing tube 32, preferably completely cover on it.

The buffer 2 of the present invention is made of porous material and is in communication with the outside air. The porous material made the buffer 2 can be sponge or fiber, the length and wall thickness of the buffer 2 can be set according to the internal space of the liquid applicator. The buffer 2 with proper capillary pressure according to the liquid used in the liquid applicator and the requirements for use.

Capillary pressure of the liquid sealing tube 32 is greater than capillary pressure of the buffer 2 by 30% or more, and the buffer 2 barely absorbs liquid from the liquid sealing tube 32 in normal condition. The inner wall of the buffer 2 and the outer wall of the liquid sealing tube 32 are connected, if an abnormal condition occurs and the liquid content in the liquid sealing tube 32 is too high, the buffer 2 will absorbs excessive liquid from the liquid sealing tube 32, which can prevent leakage of liquid from the applicating head 1. When the abnormal condition disappears, the liquid in the buffer 2 is transferred back to the liquid sealing tube 32 and returned to the reservoir 4 through the liquid-conduction channel. In order to make the buffer 2 have the above properties, the density of the buffer 2 is 0.03-0.20 g/cm3. If the buffer 2 is made of fiber, the fiber denier is preferably 0.5-30 denier.

An Applicating Head

The applicating head 1 of the present invention may be connected to the wick 31 passing through the liquid sealing tube 32, or it may be inserted into the gas-liquid exchanger 3 and connected to a part of the inner wall of the liquid sealing tube 32. It can also be served as the applicating head 1 by extending the wick 31.

A Reservoir

In the liquid applicator of the present invention, the reservoir 4 is a component for storing liquid. An upward or downward sleeve 62 can be provided on the bottom of the reservoir 4. The sleeve 62 is inserted into the gas-liquid exchanger 3, and in close contact with the inner wall of the liquid sealing tube 32, or the liquid sealing tube 32 and the wick 31 is inserted into the sleeve 62, which is beneficial to fix the gas-liquid exchanger 3, and prevent the liquid from leaking out. A replaceable reservoir 4 can be used, which is beneficial to reuse components such as the housing 6 and reduce the waste of resources. The replaceable reservoir 4 can be connected to the liquid applicator in many ways, such as screwing, carding, and so on.

The First Embodiment

Figure 1B:
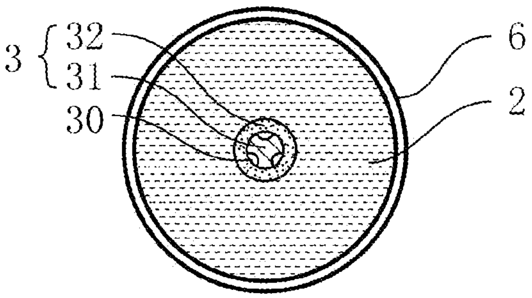
FIG. 1*b* is a cross-sectional view taken along the A-A section of FIG. 1*a;*

FIG. 1*a* is a schematic structural view of the liquid applicator according to the first embodiment of the present invention, and FIG. 1*b* is a cross-sectional view taken along the A-A section of Figure Ta. As shown in FIG. 1*a* and Tb, the liquid applicator, according to the first embodiment, comprises an applicating head 1, a buffer 2 in communication with the outside air, a gas-liquid exchanger 3, and a liquid storage 4 supplying a liquid to the gas-liquid exchanger 3.

The gas-liquid exchanger 3 has a wick 31, a liquid sealing tube 32 covering on the outer peripheral wall of the wick 31 and a gas-liquid channel 30 disposed between the wick 31 and liquid sealing tube 32.

The buffer 2 covers on the outer peripheral wall of the liquid sealing tube 32, and capillary pressure of the liquid sealing tube 32 is greater than capillary pressure of the buffer 2 by 30% or more.

According to the liquid applicator of the present embodiment, the outer peripheral wall of the wick 31 is completely covered by the the liquid sealing tube 32, one end of the wick 31 extends out of the upper end of the liquid sealing tube 32 into the reservoir 4, the other end passes through the lower end of it to connect with the applicating head 1. In the present embodiment, the wick 31 is connected against the applicating head 1.

The liquid sealing tube 32 is filtration membrane or bonded fiber, and the buffer 2 is a sponge or bonded fiber. The outer peripheral wall of the liquid sealing tube 32 is covered by the buffer 2.

The liquid applicator, according to the present embodiment also comprises a housing 6 and a partition 61, the reservoir 4 is integrated in the housing 6, the partition 61 is also used as the bottom of the reservoir 4. The partition 61 is provided with a through-hole for inserting the wick 31.

According to the liquid applicator of the present embodiment, the bottom of the reservoir 4 is provided with a downwardly extending sleeve 62, the sleeve 62 and the through-hole provided on the partition 61 to insert the wick 31 are arranged coaxially and their inner diameter is equal. When assembling, the sleeve 62 can be inserted between the liquid sealing tube 32 and the wick 31, and the outer peripheral wall of the sleeve 62 is tightly engaged with the inner wall of the liquid sealing tube 32, so that it is easy to reliably assemble between the reservoir 4 and the gas-liquid exchanger 3.

The lower part of the housing 6 can be integrated with an applicating head seat 10 mounting the applicating head 1. The applicating head seat 10 can also be molded individually and detachably mounted on the lower part of the housing 6.

The Second Embodiment

Figure 2A:
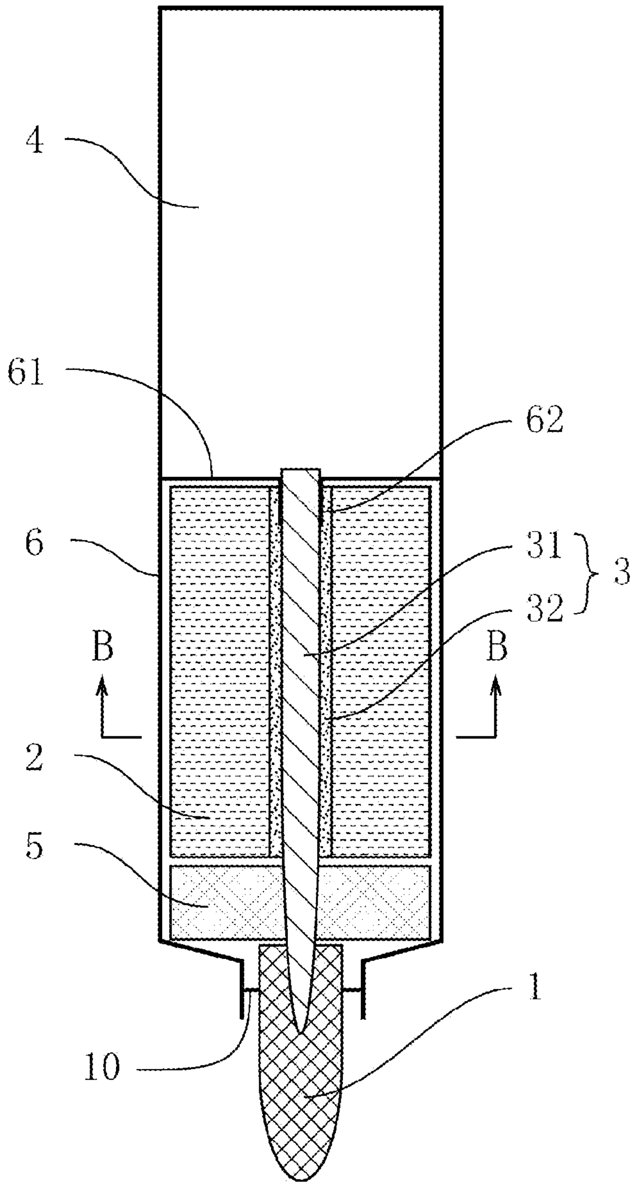
FIG. 2*a* is a schematic structural view of the liquid applicator according to the second embodiment of the present invention.
Figure 2B:
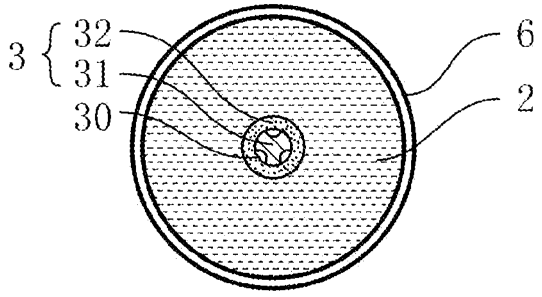
FIG. 2*b* is a cross-sectional d view taken along the B-B section of FIG. 2*a;*

FIG. 2*a* is a schematic structural view of the liquid applicator according to the second embodiment of the present invention, and FIG. 2*b* is a cross-sectional view taken along the B-B section of FIG. 2*a*. The structure of the present embodiment is similar to that of the first embodiment, and the same parts as the first embodiment will not be repeated in the description of this embodiment.

As shown in FIGS. 2*a* and 2*b*, the liquid applicator according to the second embodiment comprises an applicating head 1, a buffer 2 in communication with the outside air, a gas-liquid exchanger 3, and a liquid storage 4 supplying a liquid to the gas-liquid exchanger 3. The gas-liquid exchanger 3 includes a wick 31, a liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, capillary pressure of the liquid sealing tube 32 is greater than capillary pressure of the buffer 2 by 30% or more.

According to the liquid applicator of the present embodiment, the outer peripheral wall of the wick 31 is completely covered by the liquid sealing tube 32, one end of the wick 31 extends out of the liquid sealing tube 32 into the reservoir 4, the other end passes through it to insert into the applicating head 1.

Grooves are provided on the outer peripheral wall of the wick 31 and with the inner peripheral wall of the liquid sealing tube 32 to form a gas-liquid channel 30. That is, on the outer peripheral wall of the wick 31, one or more grooves are extended from one end to the other end to serve as a gas-liquid channel 30. In this embodiment, the number of the grooves is set to 3. Preferably, the maximum inscribed circle diameter of the grooves is 0.5 mm. In this embodiment, preferably, the wick 31 is bonded fiber or plastic.

Preferably, the liquid sealing tube 32 is bonded fiber, and the wall thickness of that is 0.5 mm. Preferably, the buffer 2 is a sponge or bonded fiber. The outer peripheral wall of the liquid sealing tube 32 is completely covered by the buffer 2.

The liquid applicator, according to the present embodiment, also comprises a housing 6 and a partition 61, the reservoir 4 is integrated in the housing 6, the partition 61 is also used as the bottom of the reservoir 4. The partition 61 is provided with a through-hole for inserting the wick 31.

According to the liquid applicator of the present embodiment, the bottom of the reservoir 4 is provided with a downwardly extending sleeve 62, the sleeve 62, and the through-hole provided on the partition 61 to insert the wick 31 are arranged coaxially, and their inner diameter is equal. When assembling, the sleeve 62 can be inserted between the liquid sealing tube 32 and the wick 31, and the outer peripheral wall of the sleeve 62 is tightly engaged with the inner wall of the liquid sealing tube 32, so that it is easy to reliably assemble between the reservoir 4 and the gas-liquid exchanger 3.

According to the liquid applicator of the present embodiment, a protection body 5 is provided below the gas-liquid exchanger 3, and its capillary pressure is not greater than the capillary pressure of the buffer 2.

In the present embodiment, the other end of the wick 31 passes through the liquid sealing tube 32, then passes through the protection body 5 and inserts into the applicating head 1 successively.

In extreme abnormal situations, such as carrying a liquid applicator from a low altitude to a high altitude or opening a liquid applicator on a high-flying plane, the liquid quickly exported from the reservoir 4 cannot be absorbed by the buffer 2 in time and lead to leakage due to the extreme air pressure difference between inside and outside of the reservoir 4. In this case, the protection body 5 can absorb the liquid that spilled quickly from the gas-liquid exchanger 3. After the abnormality is eliminated, the liquid temporarily stored in the protection body 5 is transferred to the applicating head 1 through the wick 31 or absorbed by the liquid sealing tube 32.

According to the liquid applicator of the present embodiment, it can be applied to an eyeliner. According to the liquid applicator of the present embodiment, since the number of grooves serving as the gas-liquid channel 30 is 3, at least one of which can be served as a liquid-conduction channel, the particles in the liquid eyeliner can be transported to the applicating head 1 through the groove or grooves without being filtered by the wick 31.

The Third Embodiment

Figure 3A:
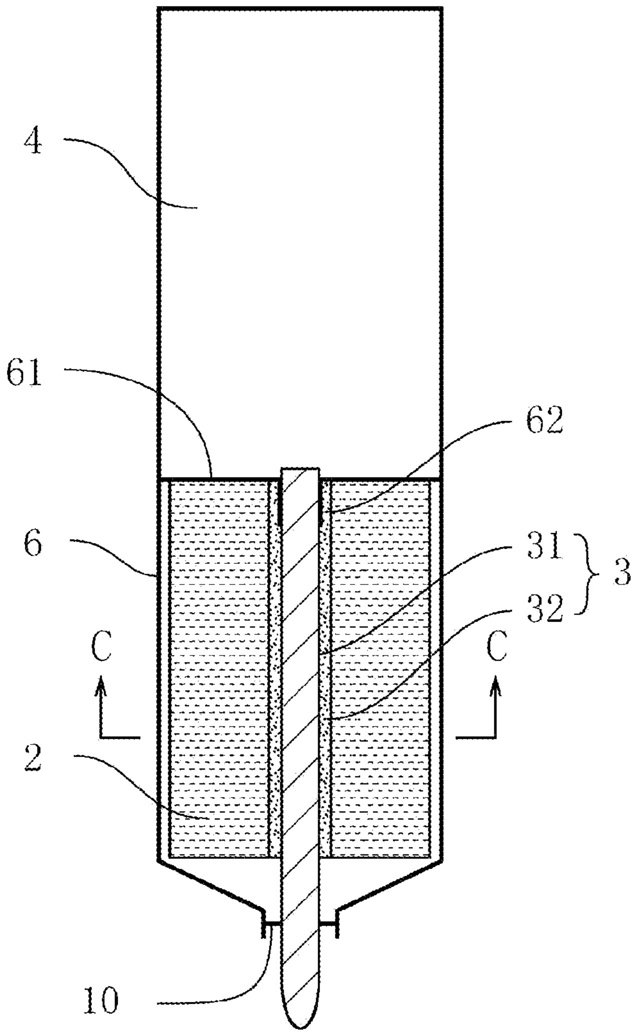
FIG. 3*a* is a schematic structural view of the liquid applicator according to the third embodiment of the present invention.
Figure 3B:
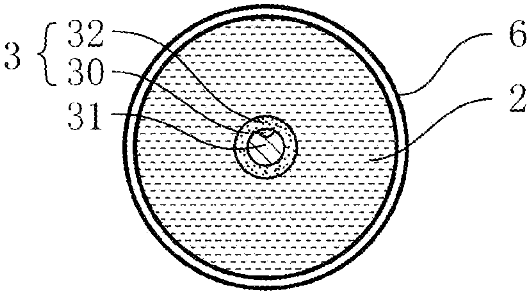
FIG. 3*b* is a cross-sectional view taken along the C-C section of FIG. 3*a;*

FIG. 3*a* is a schematic structural view of the liquid applicator according to the third embodiment of the present invention, and FIG. 3*b* is a cross-sectional view taken along the C-C section of FIG. 3*a*. The structure of the present embodiment is similar to that of the first embodiment, and the same parts as the first embodiment will not be repeated in the description of this embodiment.

As shown in FIG. 3*a* and FIG. 3*b*, the liquid applicator according to the third embodiment comprises an applicating head 1, a buffer 2 in communication with the outside air, a gas-liquid exchanger 3, and a liquid storage 4 supplying a liquid to the gas-liquid exchanger 3. The gas-liquid exchanger 3 includes a wick 31, a liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, capillary pressure of the liquid sealing tube 32 is greater than capillary pressure of the buffer 2 by 30% or more.

According to the liquid applicator of the present embodiment, the outer peripheral wall of the wick 31 is completely covered by the liquid sealing tube 32, one end of the wick 31 extends out of the liquid sealing tube 32 into the reservoir 4, the other end passes through it to insert into the applicating head 1.

Grooves are provided on the outer peripheral wall of the wick 31 and with the inner peripheral wall of the liquid sealing tube 32 to form a gas-liquid channel 30. That is, on the outer peripheral wall of the wick 31, one or more grooves are extended from one end to the other end to serve as a gas-liquid channel 30. In this embodiment, the number of the grooves is set to 1. Preferably, the maximum inscribed circle diameter of the groove is 0.3 mm. In this embodiment, preferably, the wick 31 is bonded fiber.

The liquid applicator, according to the present embodiment also comprises a housing 6 and a partition 61, the reservoir 4 is integrated in the housing 6, the partition 61 is also used as the bottom of the reservoir 4. The partition 61 is provided with a through-hole for inserting the wick 31.

According to the liquid applicator of the present embodiment, the bottom of the reservoir 4 is provided with a downwardly extending sleeve 62, the sleeve 62 and the through-hole provided on the partition 61 to insert the wick 31 are arranged coaxially and their inner diameter is equal. When assembling, the sleeve 62 can be inserted between the liquid sealing tube 32 and the wick 31, and the outer peripheral wall of the sleeve 62 is tightly engaged with the inner wall of the liquid sealing tube 32, so that it is easy to reliably assemble between the reservoir 4 and the gas-liquid exchanger 3.

Preferably, the liquid sealing tube 32 is bonded fiber and the wall thickness of that is 1 mm. Preferably, the liquid sealing tube 32 is abutted against below of the reservoir 4, i.e., against the partition 61.

Preferably, the buffer 2 is a sponge or bonded fiber. The outer peripheral wall of the liquid sealing tube 32 is completely covered by the buffer 2. Preferably, the buffer 2 and the liquid sealing tube 32 are integrally formed, the outer peripheral wall of the liquid sealing tube 32 and the inner peripheral wall of the buffer 2 are bonded.

In the present embodiment, part of the wick 31 extending out of the housing 6 is formed into the applicating head 1, i.e., the applicating head 1 and the wick 31 are integrally formed.

The Fourth Embodiment

Figure 4A:
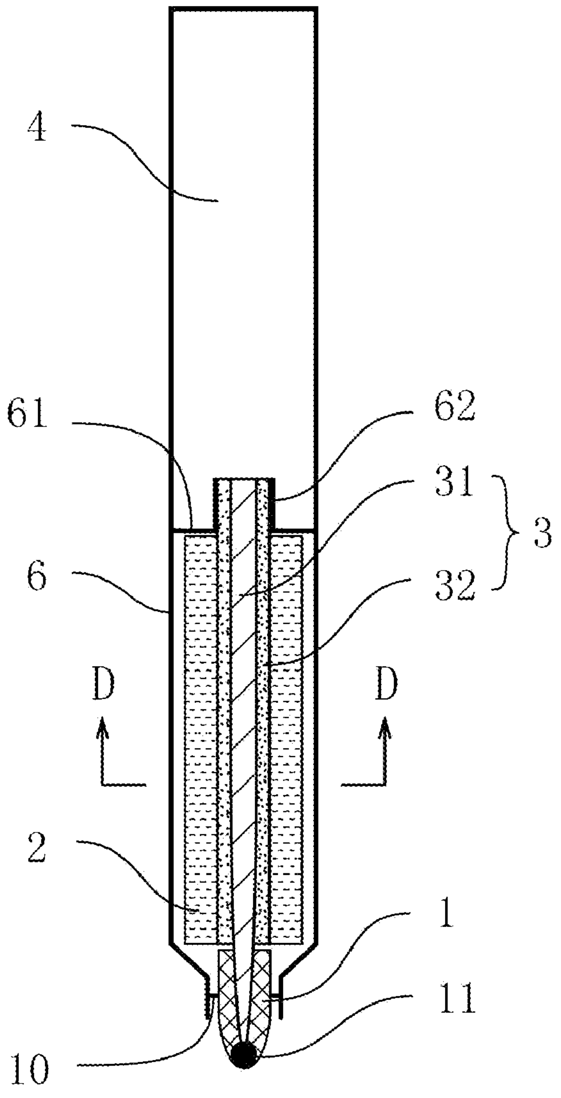
FIG. 4*a* is a schematic structural view of the liquid applicator according to the fourth embodiment of the present invention.
Figure 4B:
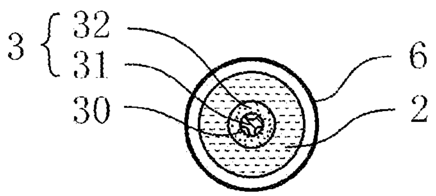
FIG. 4*b* is a cross-sectional view taken along the D-D section of FIG. 4 *a;*

FIG. 4*a* is a schematic structural view of the liquid applicator according to the fourth embodiment of the present invention, and FIG. 4*b* is a cross-sectional view taken along the D-D section of FIG. 4*a*. The structure of the present embodiment is similar to that of the first embodiment, and the same parts as the first embodiment will not be repeated in the description of this embodiment.

As shown in FIG. 4*a* and FIG. 4*b*, the liquid applicator according to the fourth embodiment comprises an applicating head 1, a buffer 2 in communication with the outside air, a gas-liquid exchanger 3, and a liquid storage 4 supplying a liquid to the gas-liquid exchanger 3. The gas-liquid exchanger 3 includes a wick 31, a liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, capillary pressure of the liquid sealing tube 32 is greater than capillary pressure of the buffer 2 by 30% or more.

According to the liquid applicator of the present embodiment, the liquid sealing tube 32 completely covers on the outer peripheral wall of the wick 31. Grooves are provided on the outer peripheral wall of the wick 31 and with the inner peripheral wall of the liquid sealing tube 32 to form a gas-liquid channel 30. That is, on the outer peripheral wall of the wick 31, one or more grooves are extended from one end to the other end to serve as a gas-liquid channel 30. In this embodiment, the number of the grooves is set to 3. Preferably, the maximum inscribed circle diameter of the grooves is 0.1 mm.

Preferably, in this embodiment, the wick 31 is polyformaldehyde plastic.

Preferably, the liquid sealing tube 32 is filtration membrane and the wall thickness of that is 0.1 mm. Preferably, the buffer 2 is a sponge or bonded fiber. The outer peripheral wall of the liquid sealing tube 32 is completely covered by the buffer 2.

The liquid applicator, according to the present embodiment, also comprises a housing 6 and a partition 61, the reservoir 4 is integrated in the housing 6, the partition 61 is also used as the bottom of the reservoir 4. The partition 61 is provided with a through-hole for inserting the wick 31.

According to the liquid applicator of the present embodiment, the bottom of the reservoir 4 is provided with a sleeve 62 extending toward the inside of the reservoir 4, the sleeve 62 and the through-hole provided on the partition 61 to insert the wick 31 are arranged coaxially and their inner diameter is equal.

One end of the wick 31 is extended out of the buffer 2 together with the liquid sealing tube 32, and inserted into the sleeve 62 of the reservoir 4.

The other end of the wick 31 is passed through the liquid sealing tube 32 and inserted into the applicating head 1. The tip of the applicating head 1 is provided with a ball 11. Preferably, the wick 31 abuts against the ball 11.

When assembling, one end of the wick 31 is inserted into the sleeve 62 of the reservoir 4 together with the liquid sealing tube 32. The outer peripheral wall of the sleeve 62 is tightly engaged with the inner wall of the liquid sealing tube 32, so that it is easy to reliably assemble between the reservoir 4 and the gas-liquid exchanger 3.

According to the liquid applicator of the present embodiment, it can be applied to a device with a small amount of fluid, such as a roller ball pen.

The Fifth Embodiment

Figure 5A:
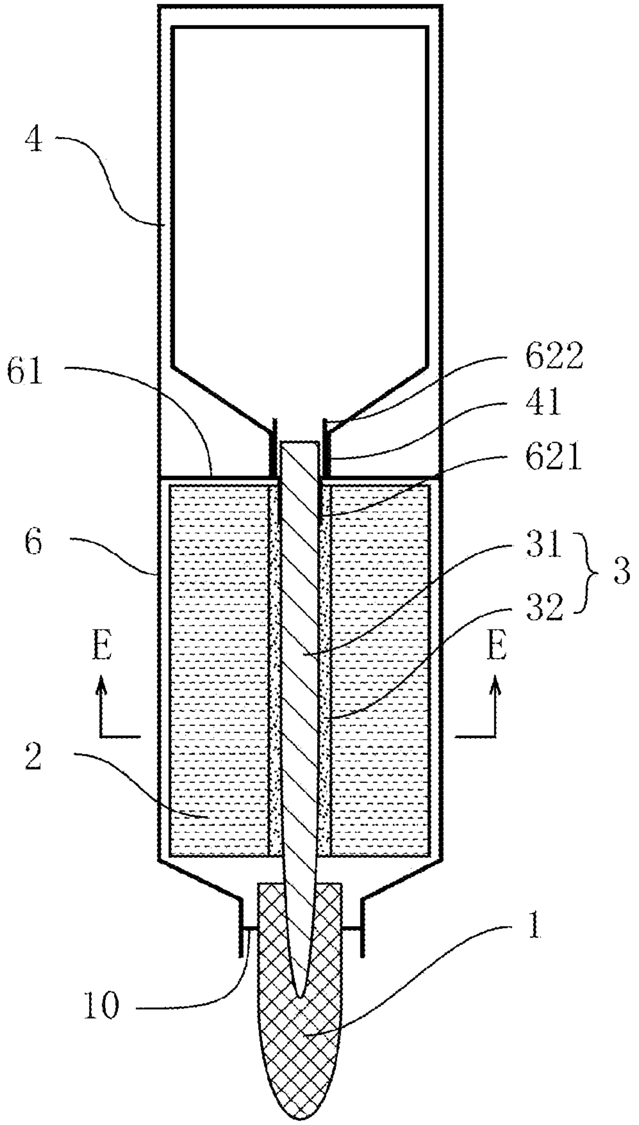
FIG. 5*a* is a schematic structural view of the liquid applicator according to the fifth embodiment of the present invention.
Figure 5B:
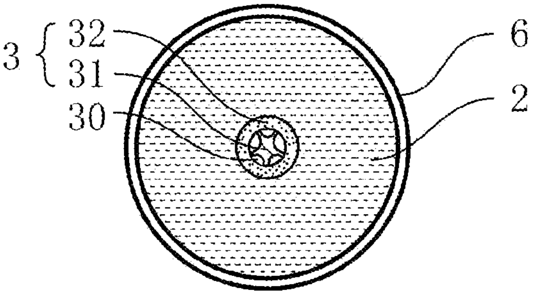
FIG. 5*b* is a cross-sectional view taken along the E-E section of FIG. 5*a;*

FIG. 5*a* is a schematic structural view of the liquid applicator according to the fifth embodiment of the present invention, and FIG. 5*b* is a cross-sectional view taken along the E-E section of FIG. 5*a*. The structure of the present embodiment is similar to that of the first embodiment, and the same parts as the first embodiment will not be repeated in the description of this embodiment.

As shown in FIGS. 5*a* and 5*b*, the liquid applicator according to the fifth embodiment comprises an applicating head 1, a buffer 2 in communication with the outside air, a gas-liquid exchanger 3 and a liquid storage 4 supplying a liquid to the gas-liquid exchanger 3. The gas-liquid exchanger 3 includes a wick 31, a liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, capillary pressure of the liquid sealing tube 32 is greater than capillary pressure of the buffer 2 by 30% or more.

According to the liquid applicator of the present embodiment, the outer peripheral wall of the wick 31 is completely covered by the liquid sealing tube 32, one end of the wick 31 extends out of the liquid sealing tube 32 into the reservoir 4, the other end passes through it to insert into the applicating head 1.

Grooves are provided on the outer peripheral wall of the wick 31 and with the inner peripheral wall of the liquid sealing tube 32 to form a gas-liquid channel 30. That is, on the outer peripheral wall of the wick 31, one or more grooves are extended from one end to the other end to serve as a gas-liquid channel 30. In this embodiment, the number of the grooves is set to 5. Preferably, the maximum inscribed circle diameter of two of the grooves is 0.8 mm, and the other there is 0.5 mm.

Preferably, the liquid sealing tube 32 is bonded fiber and the wall thickness of that is 5 mm. Preferably, the buffer 2 is bonded fiber. The outer peripheral wall of the liquid sealing tube 32 is completely covered by the buffer 2.

The liquid applicator according to the present embodiment also comprises a housing 6 and a partition 61. The partition 61 is provided with a through-hole for inserting the wick 31. The bottom of the partition 61 is provided with a downwardly extending lower sleeve 621, the lower sleeve 621 and the through-hole provided on the partition 61 to insert the wick 31 are arranged coaxially and their inner diameter is equal. The top of partition 61 is provided with an upper sleeve 622 extending toward the inside of the reservoir 4. The inner diameter of the upper sleeve 622 is slightly larger than the inner diameter of the through-hole provided on the partition 61 to insert the wick 31.

According to the liquid applicator of the present embodiment, the reservoir 4 is a replaceable reservoir 4. An interface 41 is disposed on the reservoir 4. When assembling, the interface 41 of the reservoir 4 is clamped with the upper sleeve 622 of the partition 61 to form a liquid seal. The lower sleeve 621 can be inserted between the liquid sealing tube 32 and the wick 31, the outer peripheral wall of the lower sleeve 621 is tightly engaged with the inner wall of the liquid sealing tube 32, so that it makes easy to reliably assemble between the reservoir 4 and the gas-liquid exchanger 3 and replace the reservoir 4.

According to the liquid applicator of the present embodiment, it can be served as a device with a large amount of fluid, such as ink brush.

The Sixth Embodiment

Figure 6A:
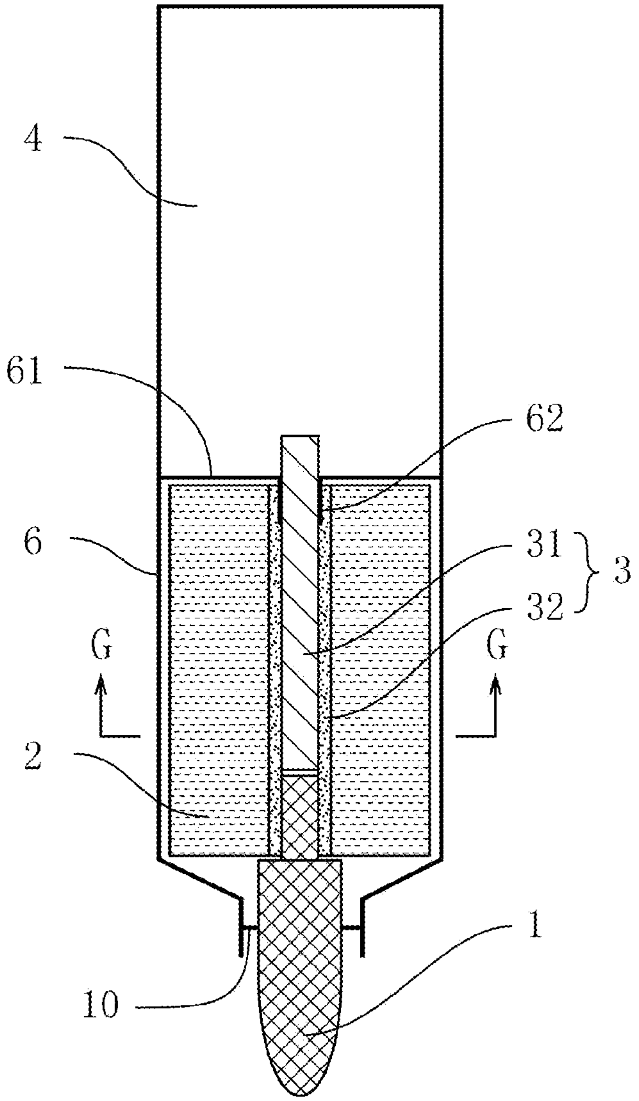
FIG. 6*a* is a schematic structural view of the liquid applicator according to the sixth embodiment of the present invention.
Figure 6B:
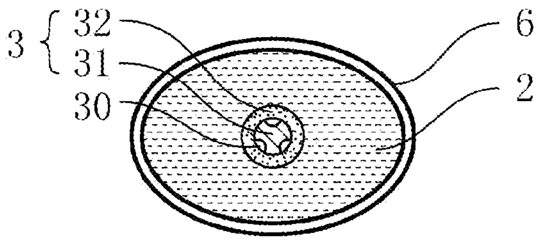
FIG. 6*b* is a cross-sectional view taken along the G-G section of FIG. 6*a*.

FIG. 6*a* is a schematic structural view of the liquid applicator according to the sixth embodiment of the present invention, and FIG. 6*b* is a cross-sectional view taken along the G-G section of FIG. 6*a*. The structure of the present embodiment is similar to that of the first embodiment, and the same parts as the first embodiment will not be repeated in the description of this embodiment.

As shown in FIGS. 6*a* and 6*b*, the liquid applicator according to the sixth embodiment comprises an applicating head 1, a buffer 2 in communication with the outside air, a gas-liquid exchanger 3, and a liquid storage 4 supplying a liquid to the gas-liquid exchanger 3. The gas-liquid exchanger 3 includes a wick 31, a liquid sealing tube 32 covering on the outer peripheral wall of the wick 31, and a gas-liquid channel 30 disposed between the wick 31 and the liquid sealing tube 32; the buffer 2 covers on the outer peripheral wall of the liquid sealing tube 32, capillary pressure of the liquid sealing tube 32 is greater than capillary pressure of the buffer 2 by 30% or more.

According to the liquid applicator of the present embodiment, the outer peripheral wall of the wick 31 is partially covered by the the liquid sealing tube 32, one end of the wick 31 extends out of the liquid sealing tube 32 into the reservoir 4, the other end is located at inside the liquid sealing tube 32 and the distance between in and the bottom surface of the liquid sealing tube 32 is about a quarter of the axial height of the the liquid sealing tube 32.

Grooves are provided on the outer peripheral wall of the wick 31 and with the inner peripheral wall of the liquid sealing tube 32 to form a gas-liquid channel 30. That is, on the outer peripheral wall of the wick 31, one or more grooves are extended from one end to the other end to serve as a gas-liquid channel 30. In this embodiment, the number of the grooves is set to 3. Preferably, the maximum inscribed circle diameter of the grooves is 0.2 mm. In this embodiment, preferably, the wick 31 is bonded fiber.

Preferably, the liquid sealing tube 32 is bonded fiber and the wall thickness of that is 0.5 mm. Preferably, the buffer 2 is bonded fiber. The outer peripheral wall of the liquid sealing tube 32 is bonded to the inner peripheral wall of the buffer 2.

The liquid applicator, according to the present embodiment, also comprises a housing 6 and a partition 61, the reservoir 4 is integrated in the housing 6, the partition 61 is also used as the bottom of the reservoir 4. The partition 61 is provided with a through-hole for inserting the wick 31.

According to the liquid applicator of the present embodiment, the bottom of the reservoir 4 is provided with a downwardly extending sleeve 62, the sleeve 62 and the through-hole provided on the partition 61 to insert the wick 31 are arranged coaxially and their inner diameter is equal. When assembling, the sleeve 62 can be inserted between the liquid sealing tube 32 and the wick 31, and the outer peripheral wall of the sleeve 62 is tightly engaged with the inner wall of the liquid sealing tube 32, so that it is easy to reliably assemble between the reservoir 4 and the gas-liquid exchanger 3.

In the present embodiment, the applicating head 1 is inserted into the gas-liquid exchanger 3 and connected to a part of the inner wall of the liquid sealing tube 32. The rear end of the applicating head 1 is integrally provided with an insertion part which is cylindrical, square, or conical, the insertion part is inserted into the liquid sealing tube 32 and abutted with or close to the wick 31. Preferably, a groove is formed on the outer peripheral wall of the insertion part to form a gas-conduction channel.

As shown in FIG. 6*b*, according to the liquid applicator of the present embodiment, the housing 6 and the buffer 2 can be provided with an elliptical cross section, so that it can be applied to a device with medium laydown of fluid, such as highlighter marker.

The examples are cited only to demonstrate and interpret the principles and efficacies of the present invention, and do not in any way limit the present invention. Any person familiar with the technology may modify or change the above examples without prejudice to the spirit and scope of the present invention. Thus, all the equivalent modifications and changes to the present invention made by any person with common knowledge in the field without breaking away from the spirits and technical ideas disclosed by the present invention shall fall within the scope of the claims of the present invention. The liquid applicator of the present invention generally refers to a device for writing and painting in office supplies, various types of liquid application devices used in cosmetics and other fields, etc.

The invention claimed is:

1. A liquid applicator comprising:

an applicating head;

a buffer in communication with outside air;

a gas-liquid exchanger; and a reservoir supplying a liquid to the gas-liquid exchanger;

wherein the gas-liquid exchanger comprises a wick having an outer peripheral wall, a liquid sealing tube covering the outer peripheral wall and a gas-liquid channel disposed between the wick and the liquid sealing tube;

wherein the buffer covers the outer peripheral wall of the liquid sealing tube;

wherein capillary pressure of the liquid sealing tube is larger than capillary pressure of the buffer.

2. The liquid applicator as claimed in claim 1, wherein grooves are provided on outer peripheral wall of the wick, and the gas-liquid channel is formed between the grooves and an inner peripheral wall of the liquid sealing tube.

3. The liquid applicator as claimed in claim 1, wherein the liquid sealing tube comprises a porous material.

4. The liquid applicator as claimed in claim 1, wherein a cross section of a gas-conduction channel has a maximum circular cross-section of 0.1-0.8 mm when the gas-liquid channel serves as the gas-conduction channel.

5. The liquid applicator as claimed in claim 1, wherein the buffer comprises a porous material.

6. The liquid applicator as claimed in claim 1, wherein the wick passes through a lower end of the liquid sealing tube to connect to the applicating head.

7. The liquid applicator as claimed in claim 1, wherein a sleeve is provided at an end of the reservoir.

8. The liquid applicator as claimed in claim 1, wherein a protective body is provided under the gas-liquid exchanger, and capillary pressure of the protective body is not greater than capillary pressure of the buffer.

9. The liquid applicator as claimed in claim 1, wherein the buffer and the liquid sealing tube are integrally formed, and the outer peripheral wall of the liquid sealing tube and an inner peripheral wall of the buffer are bonded.

10. The liquid applicator as claimed in claim 1, wherein the applicating head is inserted into the gas-liquid exchanger and connected to a part of an inner wall of the liquid sealing tube.

11. The liquid applicator as claimed in claim 1 wherein the capillary pressure of the liquid sealing tube is at least 30% larger than the capillary pressure of the buffer.

12. The liquid applicator as claimed in claim 1 wherein the buffer is adapted to absorb excessive liquid from the liquid sealing tube.

13. The liquid applicator as claimed in claim 1 wherein the wick acts as an applicator head.

14. The liquid applicator as claimed in claim 1 wherein the reservoir is replaceable.

15. The liquid applicator as claimed in claim 2 wherein the outer peripheral wall of the wick comprises three grooves.

16. The liquid applicator as claimed in claim 2 wherein a maximum inscribed diameter of each groove is 0.5 mm.

17. The liquid applicator as claimed in claim 1 further comprises a partition which is used as a bottom of the reservoir and includes a hole for receiving the wick.

18. The liquid applicator as claimed in claim 1 further comprises a protective body positioned underneath the gas-liquid exchanger adapted to absorb ink overflowing from the buffer.

19. The liquid applicator as claimed in claim 1 wherein one groove is provided on outer peripheral wall of the wick.

20. The liquid applicator as claimed in claim 19 wherein the wick comprises a bonded fiber.

* * * * *